No. 859,789. PATENTED JULY 9, 1907.
S. P. VAUGHN.
NUT LOCK.
APPLICATION FILED NOV. 7, 1906.

Witnesses
T. R. Mockler
James F. Crown

Inventor
Sidney P. Vaughn
Geo. S. Vashon
Attorney

UNITED STATES PATENT OFFICE.

SIDNEY P. VAUGHN, OF ACKERMAN, MISSISSIPPI.

NUT-LOCK.

No. 859,789.　　　　Specification of Letters Patent.　　　　Patented July 9, 1907.

Application filed November 7, 1906. Serial No. 342,336.

*To all whom it may concern:*

Be it known that I, SIDNEY P. VAUGHN, a citizen of the United States, residing at Ackerman, in the county of Choctaw and State of Mississippi, have invented new and useful Improvements in Nut-Locks, of which the following is a specification.

This invention relates to a nut lock, and the object of the same is to provide a device of this class adapted for general uses, but particularly adapted for holding a nut on the end of an axle in a positive and reliable manner and preventing wheels from running off the axle and thus avoiding accidents.

The invention consists in the construction and arrangement of the several parts which will be more fully hereinafter specified.

Figure 1:
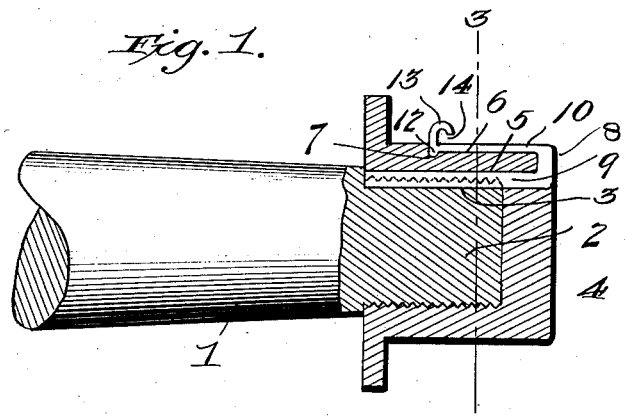
Figure 2:
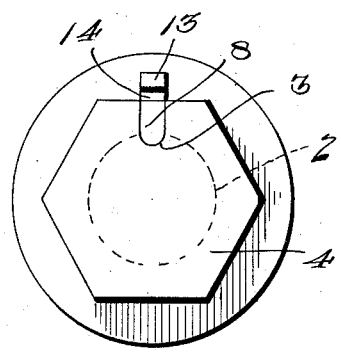
Figure 3:
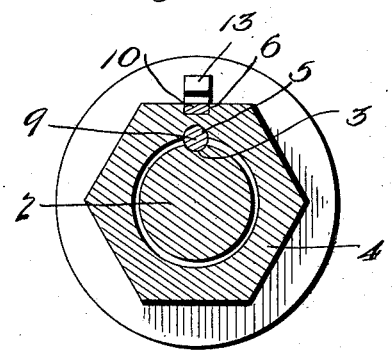
Figure 4:
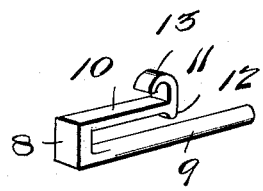

In the drawings, Figure 1 is a longitudinal vertical section of a portion of a wheel axle showing the nut thereon and the improved lock applied thereto. Fig. 2 is an end elevation of the same. Fig. 3 is a section on the line 3—3, Fig. 1. Fig. 4 is a detail perspective view of the locking device or key.

Like characters refer to like parts throughout the several views.

The numeral 1 designates an axle of ordinary form having an outer screw-threaded extremity 2 as usual in devices of this class. The upper portion of the screw-threaded extremity is formed with a longitudinal groove 3 which cuts through the threads of the said extremity. The nut 4 is of the usual cap nut type and has a hole or opening 5 drilled or otherwise formed therein and extending completely therethrough and adapted to aline or coincide with the groove 3. The exterior portion of the nut in line with the opening 5 is formed with a groove 6 terminating at its inner end in a seat 7. The improved locking device or key embodies a head 8 having a rounded pin or shank 9 projecting from the lower extremity thereof and an upper flat tongue 10 which is considerably thinner than the pin or shank 9 and is free to have resilient action. At the inner end or extremity of the tongue 10 is a catch 11 embodying a depending nose 12 and an upper curved releasing projection 13 overhanging and forming the upper wall of a recess 14.

After the nut is fully applied to the screw threaded extremity 2 of the axle 1 and the opening 5 is in alinement with the groove 3, the key is inserted and driven home, the pin 9 passing through the opening 5 and groove 3 and the nose riding over the base of the groove 6 in the nut, the tongue 10 being under such conditions sprung upwardly and remaining under tension or in abnormal condition until the depending nose springs into the seat 7 thus locking the key in positive and assembled relation with respect to the axle extremity and nut. The pin 9 passing through the nut opening 5 and engaging the groove 3 will prevent any movement of the nut and hence there is no liability of the nut becoming loose and a wheel engaging the axle with the improved nut lock coöperating therewith will be prevented from running off the said axle. To release the nut, the tool or implement of any suitable form is inserted under the projection 13 and the nose 12 is raised from the seat 7 and as soon as said nose clears the seat the key can be drawn outwardly and removed from the nut and axle extremity and permit the nut to be run off for lubricating the axle or for other purposes.

The improved nut-lock can be applied to either a wagon or buggy axle at a very small expense. It can also be rendered applicable to axles and nuts now in use without material expense by grooving the axles and suitably boring and grooving the nuts in accordance with the structures hereinbefore explained.

What I claim is:

The combination of an axle having a screw-threaded extremity with a groove extending longitudinally thereof and cutting the threads of the same, a nut having an opening therethrough, and a surface groove terminating at its inner extremity in a seat, and a key having a lower rounded pin and an upper resilient tongue of less length than the pin and provided at its inner end with a depending nose and an upper outwardly-extending projection, the projection and nose being primarily formed with the tongue.

In testimony whereof, I affix my signature in presence of two witnesses.

SIDNEY P. VAUGHN.

Witnesses:
　M. A. PHILBRICK,
　ROBT. A. DAWES.